United States Patent
Schwarz et al.

(10) Patent No.: US 9,525,858 B2
(45) Date of Patent: Dec. 20, 2016

(54) DEPTH OR DISPARITY MAP UPSCALING

(75) Inventors: Sebastian Schwarz, Sundsvall (SE); Ivana Girdzijauskas, Solna (SE); Roger Olsson, Sundsvall (SE); Mårten Sjöström, Sundsvall (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 244 days.

(21) Appl. No.: 14/131,051

(22) PCT Filed: May 21, 2012

(86) PCT No.: PCT/SE2012/050544
§ 371 (c)(1),
(2), (4) Date: Jan. 6, 2014

(87) PCT Pub. No.: WO2013/006115
PCT Pub. Date: Jan. 10, 2013

(65) Prior Publication Data
US 2014/0146139 A1    May 29, 2014

Related U.S. Application Data

(60) Provisional application No. 61/504,814, filed on Jul. 6, 2011.

(51) Int. Cl.
*H04N 13/00* (2006.01)
*G06T 7/00* (2006.01)

(52) U.S. Cl.
CPC ......... *H04N 13/0018* (2013.01); *G06T 7/0059* (2013.01); *H04N 13/0022* (2013.01); *G06T 2207/20016* (2013.01)

(58) Field of Classification Search
CPC .................................................. H04N 13/0022
USPC ............................................................ 348/43
See application file for complete search history.

(56) References Cited

U.S. PATENT DOCUMENTS

| | | | |
|---|---|---|---|
| 2010/0201682 A1 | 8/2010 | Quan et al. | |
| 2011/0069152 A1* | 3/2011 | Wang | G06T 7/0081 348/43 |
| 2011/0096832 A1* | 4/2011 | Zhang | G06T 7/0071 375/240.08 |

(Continued)

FOREIGN PATENT DOCUMENTS

| | | |
|---|---|---|
| EP | 2169619 A2 | 3/2010 |
| WO | 2010087751 A1 | 8/2010 |

OTHER PUBLICATIONS

Benjamin Huhle.(2007) Integrating 3D Time of Flight camera Data and High Resolution Images University of Tubingen WSI/GRIS, May 2007, 4 pages, published by IEEE ).*

(Continued)

*Primary Examiner* — Masum Billah
(74) *Attorney, Agent, or Firm* — Rothwell, Figg, Ernst & Manbeck, p.c.

(57) ABSTRACT

Method and arrangement for increasing the resolution of a depth or disparity map related to multi view video. The method comprises deriving a high resolution depth map based on a low resolution depth map and a masked texture image edge map. The masked texture image edge map comprises information on edges in a high resolution texture image, which edges have a correspondence in the low resolution depth map. The texture image and the depth map are associated with the same frame.

11 Claims, 11 Drawing Sheets

(56) References Cited

U.S. PATENT DOCUMENTS

2012/0200669 A1* 8/2012 Lai .................. G06T 5/002
348/43

OTHER PUBLICATIONS

Benjamin Huhle. (2007) Integrating 3D Time of Flight camera Data and High Resolution Images University of Tubingen WSI/GRIS, May 2007, 4 pages, published by IEEE ).*

"Applications and Requirements on 3D Video Coding", Video and Requirements, ISO/IEC JTC1/SC29/WG11, MPEG 2011/N12035, Mar. 2011, 7 pages.

M. Bleyer, et al. "Graph-based Surface Reconstruction From Stereo Pairs Using Image Segmentation," SPIE, vol. 5665, Jan. 2005, pp. 288-299.

Y. Boykov, et al., "An Experimental Compression of Min-Cut/Max-Flow Algorithms for Energy Minimization in Vision", IEEE Transactions on Pattern Analysis and Machine Intelligence, Sep. 2004, vol. 26, No. 9, pp. 1124-1137.

D. Chan, et al., "A Noise Aware Filter for Real-Time Depth Upsampling", Workshop on Multi-camera and Multi-modal Sensor Fusion Algorithms and Applications, 2008, M2SFA2, 12 pages.

J. Diebel, et al., "An Application of Markov Random Fields to Range Sensing", Proceedings of Conference on Neural Information Processing Systems, 2005, 8 pages.

E. Ekmekcioglu, et al.,"Utilisation of Edge Adaptive Upsampling in Compression of Depth MAP Videos for Enhanced Free-Viewpoint Rendering", Proceedings of the 16th IEEE international conference on Image processing (ICIP'09), Magdy Bayoumi (Ed.). IEEE Press, Piscataway, NJ, USA, Nov. 7, 2009, pp. 733-736.

P.F. Felzenszwalb et al., "Efficient Belief Propagation for Early Vision", in CVPR, 2004, pp. 261-268.

F. Garcia, et al., "Pixel Weighted Average Strategy for Depth Sensor Data Fusion", IEEE 17th International Conference on Image Processing, Sep. 26, 2010, 4 pages.

L. Hong et al., "Segment-Based Stereo Matching Using Graph Cuts," CVPR, pp. 74-81, 2004.

B. Huhle, et al., "Integrating 3D Time-of-Flight Camera Data and High Resolution Images for 3DTV Applications", 3DTV Conference, 2007 IEEE, May 1, 2007, 4 pages.

J. Kopf, et al., "Joint Bilateral Upsampling", ACM Transactions on Graphics, Jul. 2007, vol. 26, No. 3, Article 96, 6 pages.

Yanjie Li, et al., "Joint Example-Based Depth Map Super-Resolution", 2012 IEEE International Conference on Multimedia and Expo, IEEE Computer Society, 2012, pp. 152-157.

L. F Portugal, et al., "A Comparison of Block Pivoting and Interior-Point Algorithms for Linear Least Squares Problems with Nonnegative Variables", Mathematics of Computation, Oct. 1994, vol. 63, No. 208, pp. 625-643.

V Velisavljevic, et al., "Bit Allocation for Multiview Image Compression Using Cubic Synthesized View Distortion Model", Multimedia and Expo (ICME), 2011 IEEE International Conference on Multimedia and Expo, Jul. 11, 2011, 6 pages.

D. Ziou , et al., "Edge Detection Techniques—An Overview," International Journal of Pattern Recognition and Image Analysis, 1998, vol. 8, No. 4, pp. 537-559.

C. L. Zitnick, et. al.. "High-Quality Video View Interpolation Using a Layered Representation", ACM SIGGRAPH, Aug. 2004, vol. 23, No. 3, pp. 600-608.

International Search Report from PCT Application No. PCT/SE2012/050544, dated Jan. 25, 2013, 4 pages.

* cited by examiner (a)　　　　　　　(b)　　　　　　　(c)

(a) true depth    (b) nearest neighbour (prior art)    (c) JBU (prior art)    (d) EWOC (a)

(b)

(a)

(b)

DEPTH OR DISPARITY MAP UPSCALING

CROSS REFERENCE TO RELATED APPLICATION(S)

This application is a 35 U.S.C. §371 National Phase Entry Application from PCT/SE2012/050544 filed May 21, 2012, which cairns priority to U.S. Provisional Application No. 61/504,814, filed Jul. 6, 2011. The above identified applications are incorporated by reference.

TECHNICAL FIELD

The herein suggested solution relates generally to 3D video, and especially to the upscaling of depth or disparity maps associated with 3D video.

BACKGROUND

The research in 3D video has gained a lot of momentum in recent years, and there is a lot of interest from industry, academy and consumer society. A number of 3D movies are being produced every year, providing great stereoscopic effects to the spectators. However, this is only a part of the story. Namely, we can already enjoy the 3D experience at home, and in the very near future, we will have 3D-enabled mobile phones as well.

The term "3D" is usually connected to stereoscopic experience, where the eyes of a user are provided with slightly different images of a scene which are further fused by the brain to create a depth impression. However, there is much more to 3D. Free viewpoint television (FTV) is a novel audio-visual system that allows users to have a 3D visual experience while freely changing their position in front of a 3D display. Unlike the typical stereoscopic television, which enables a 3D experience to users that are sitting at a fixed position in front of a screen, FTV allows users to observe the scene from many different angles, as if they were there.

The FTV functionality is enabled by multiple components. The 3D scene is captured by many cameras and from different views (angles) which is also referred to as "multiview video". Different camera arrangements are possible, depending on the application. For example, the camera arrangement may be relatively simple, comprising a parallel set of cameras on a 1D line, or, in more complex scenarios, it may include e.g. 2D camera arrays forming an arc structure. Multiview video is almost with no exception considered in combination with other 3D scene components, such as depth map, disocclusion map or similar. The main reason for that is the transmission cost of the huge amount of data that the multiview video carries. For example, if transmitting a subset, e.g. 2-3, of the views of a whole multiview video acquired together with their depth maps, other views may be reconstructed at a receiver, based on this information. The required bandwidth is then significantly reduced, as compared to if all views would be transmitted.

Multiview video can be relatively efficiently encoded by exploiting both temporal and spatial similarities that exist in different views. The first version of multiview video coding (MVC) was standardized in July 2008. However, even with MVC, the transmission cost remains prohibitively high. This is why often only a subset of captures multiple views is actually being transmitted. To compensate for the missing information, depth and disparity maps can be used instead. A depth map is a simple grayscale image, wherein each pixel indicates the distance between the corresponding pixel from a video object and the capturing camera. Disparity, on the other hand, is the apparent shift of a pixel which is a consequence of moving from one viewpoint to another. Depth and disparity are mathematically related and can be interchangeably used. The main property of depth/disparity maps is that they contain large smooth surfaces of constant grey levels. This makes them much easier to compress with current video coding technology, as compared to regular video images.

Henceforth in this description, the terms "depth" and "depth map" will be used for simplicity reasons. However, it should be noted, and would be clear to a person skilled in the art, that the technical solution described herein applies also to disparity and disparity maps.

From the multiview video and depth information a virtual view at an arbitrary viewing position can be generated, as depicted in FIG. 1a.

Having good quality depth maps is of crucial importance for the quality of generated or reconstructed 3D views. For example, errors in a depth map translate to incorrect shifts of texture pixels in a synthesized view. This is especially visible around object boundaries, where pixels from foreground objects may be incorrectly copied to the background, and vice versa. This results in a very annoying experience for a viewer of the 3D video.

Depth maps are usually estimated, and there is a wealth of algorithms available for that purpose. However, the quality of depth maps estimated this way is still far from acceptable. There are number of reasons for this. Firstly, pixels in occluded regions, i.e. regions visible in one of the images but not in the other one(s), cannot be correctly estimated. Secondly, images used for depth estimation are always affected by some level of sensor noise, which affects the accuracy of depth maps. Further, brightness constraints imposed on images used in depth estimation algorithms, such as the assumption that the brightness value of a pixel does not change between the views, are difficult to meet in practice.

As an alternative to using an estimation algorithm, depth maps can be obtained by specialized cameras, e.g., infrared or time-of-flight (ToF) cameras. Unfortunately, current ToF sensors do not yet provide competitive resolutions compared to video cameras.

Transmission of depth maps in a reduced resolution seems to be a valid and desirable solution. Being simpler than the regular video signals, depth maps can be down sampled without too much loss of information. Thus not only the bitrate is reduced, but also a constraint by the display manufacturers is met. This motivates the search for new effective depth upscaling concepts.

Standard depth upscaling methods such as nearest neighbor, linear, bilinear or bicubic interpolation provide only limited quality results. For example, one common artifact when using these methods is a smearing of object borders in synthesized views, as can be seen in FIG. 1b.

Attempts have been made to solve the problems of these standard upscaling methods by taking all available data into account and utilize the full resolution texture image in the upscaling process. There are several different approaches for this, like the use of Markov Random Fields (MRF) or joint-bilateral upscaling (JBU). Especially JBU gained a lot of interest and lead to several extensions: Further, a noise-aware filter has been suggested (by Chan et al. [1]) for depth upsampling (NAFDU), switching between bilateral & joint-bilateral filtering depending on a pre-filtered depth map.

Further, the JBU filtering has been expanded (by Garcia et al. [2]) with a credibility map, weighting every pixel based on the ToF depth map.

These methods, however, introduces other errors. For example, one of the main error-sources in JBU-based approaches is copying of texture-information into smooth depth areas, as shown in FIG. 2a-c.

SUMMARY

It would be desirable to improve the quality of reconstructed 3D video. This could be achieved by improving the quality of the depth or disparity maps. It is an object of the invention to improve upscaling of low resolution depth or disparity maps to high resolution depth or disparity maps. This is achieved by a method and arrangement according to the claims provided herein.

According to a first aspect, a method is provided for increasing the resolution of a depth or disparity map related to multi view video. The method comprises deriving of a high resolution depth map based on a low resolution depth map and a masked texture image edge map. The masked texture image edge map comprising information on edges, in a high resolution texture image, which edges have a correspondence in the low resolution depth map. The texture image and the depth map are associated with the same frame, and for clarity it could be pointed out that the low resolution depth map has a lower resolution than the texture image.

According to a second aspect, an arrangement is provided for increasing the resolution of a depth map related to multi-view video. The arrangement comprises an upscaling unit, adapted to derive a high resolution depth or disparity map based on a low resolution depth or disparity map and a masked high resolution texture image edge map comprising information on edges in a texture image edge map, which edges have a correspondence in the low resolution depth or disparity map. The texture image and the depth or disparity map are associated with the same frame, and the low resolution depth or disparity map has a lower resolution than the texture image.

The above method and arrangement enable deriving of smoother and better quality high resolution depth or disparity maps, as compared to what can be achieved by methods according to the prior art. A comparison can be seen e.g. in FIG. 5. The quality of views synthesized with depth or disparity maps derived according to the herein suggested method is consequently higher, as compared to what is achieved by prior art solutions, as shown e.g. in FIGS. 6-7. This holds both objectively and subjectively The above method and arrangement may be implemented in different embodiments. The high, or increased, resolution depth map may be derived from a sparse depth map based on edge weights derived from the masked texture image edge map. The deriving of a high resolution depth map may involve a weighting function, Q, allowing pixels associated with edges to be less similar to their neighboring pixels as compared to pixels not associated with edges.

Further, the masked texture image edge map may be derived by performing edge filtering on a high resolution texture image, resulting in a texture image edge map, and performing edge filtering on a low resolution depth map of a lower resolution than the texture image, resulting in a low resolution depth edge map. The texture image edge map could then be masked based on information from the low resolution depth edge map.

According to a third aspect, a codec is provided, which comprises an arrangement according to the second aspect.

According to a fourth aspect, a mobile terminal is provided, which comprises an arrangement according to the second aspect Further, a computer program is provided, comprising computer readable code means, which when run in an arrangement according to the second aspect above, causes the arrangement to perform the corresponding method according to the first aspect above. Further, a computer program product is provided, comprising said computer program.

The embodiments above have mainly been described in terms of a method. However, the description above is also intended to embrace embodiments of the arrangement, adapted to enable the performance of the above described features. The different features of the exemplary embodiments above may be combined in different ways according to need, requirements or preference.

BRIEF DESCRIPTION OF THE DRAWINGS

The suggested technology will now be described in more detail by means of exemplifying embodiments and with reference to the accompanying drawings, in which.

DETAILED DESCRIPTION

Herein, an alternative solution to upscale low resolution depth data to match high resolution texture data is proposed. A method is introduced herein for fusing low resolution depth maps with corresponding high resolution video frames by solving an overdetermined linear equation system. Similar to other approaches, edge information is taken from a high resolution texture image. However, herein, the information from the high resolution texture image is further refined by that it is validated by use of the low resolution depth or disparity map, and the correlated data is accentuated. The result is striking.

Figure 4:
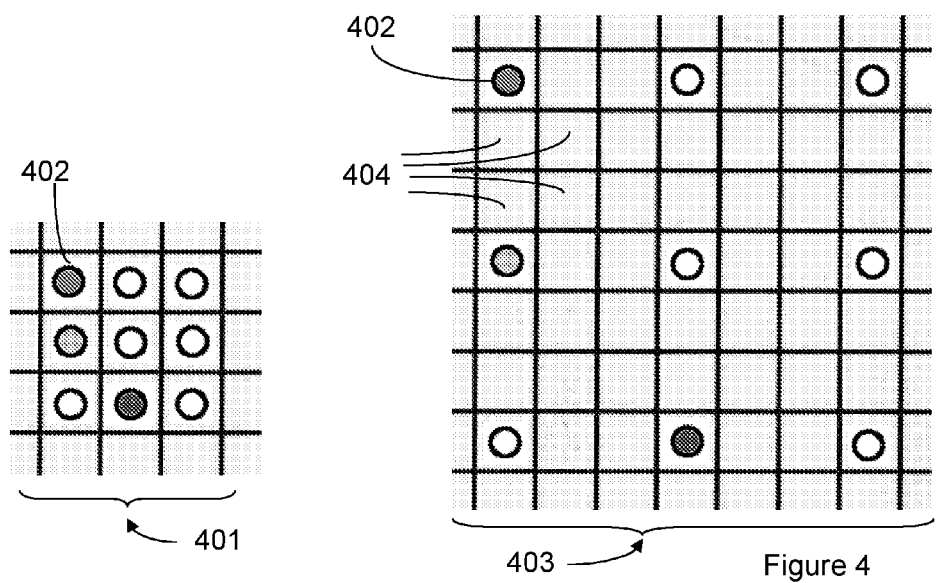
FIG. 4 illustrates a pixel mapping principle: (Left) low resoluted image, (Right) "high resoluted" image with sparse pixel values, also denoted a sparse image.

In this suggested solution, the low resolution depth map is considered as a sparse representation of the desired high resolution depth map. Starting from a low resolution depth map 401, the known values 402 are plotted on the corresponding positions of a full resolution depth map having the same resolution as the, full resolution, texture image. This plotting results in a sparse depth map 403, which is also illustrated in FIG. 4. The full resolution texture image is edge filtered and the resulting edge map is then masked with edge information from the low resolution depth map. The empty positions 404 of the sparse depth map 403 are then filled by solving a least square error problem using the masked edge map as weight.

In decompression or upscaling of video depth or disparity maps, a spatial smoothness requirement is introduced, encouraging the depth of each pixel d(x, y) to be similar to its spatial neighbors. However, this spatial smoothness requirement alone would lead to blurred depth edges, or edge blending, at object borders, since the whole image is smoothened.

In order to avoid such edge blending, each smoothness requirement is weighted with a weighting map $Q_E$, which is based on an edge map, so that pixels at edges are less constrained to be similar.

$$Q_E(x,y)(d(x,y)-d(x+1,y))=0 \quad (1)$$

$$Q_E(x,y)(d(x,y)-d(x,y+1))=0 \quad (2)$$

In the solution described herein, the weighting map $Q_E$ is generated from two parts, which will be defined in the following. A first part is an edge map of a full resolution image, "I", and the other part is a mask gained from edge information in a low resolution depth map, $D_{low}$, associated with the full resolution image I.

The edge map, $E_I$, of the full resolution texture image, may be generated by a combination of edge detectors and image filters to ensure the most accurate edges possible. It can be obtained by a so-called "Canny'" edge detector, or any other state-of-the-art edge detector. Moreover, the edge detector can be applied only on the luminance channel of the full texture image, I, resulting in the logical edge map $C_Y$, or, the edge map $E_I$ can be a combination of edges from more channels or even further—more color spaces. For example, the full texture image I could be transferred into the HSV color space (Hue, Saturation and Value of brightness) and, and edge maps from all different spaces and/or channels could be combined.

The full resolution texture image edge map $E_I$ can further be improved by adding the results of horizontal and vertical Sobel filtering of the full resolution texture image I. The edge map $E_I$ of image I can in that case be described as a combination of the following edge maps $E_{I1}$ and $E_{I2}$:

$$E_{I1}=(C_Y U C_H U C_S U C_V) \quad (3)$$

$$E_{I2}=(I*S_x)/255+(I*S_y)/255 \quad (4)$$

where C stands for the edge detection results on the different color channels. $S_x$ and $S_y$ stand for the results of the horizontal and vertical Sobel operator respectively. This means that at logical zeros in $E_{I1}$ we take the edge gradient values from $E_{I2}$, logical ones remain.

However, although the above methods for improving the edge map could improve the final result, studies have shown that the use of a simple edge detector/edge filter for generating the edge map $E_I$ may be sufficient for achieving a satisfying result.

The outcome is a texture image edge map $E_I$ with a continuous value range of [0, 1], which includes many edges where there, in fact, is no depth change. For example, some of the edges may represent color or luminance changes on a flat surface. Such edges, not representing depth changes, may lead to an unwanted structurization in areas with otherwise smooth depth, which may result in visual artifacts.

Herein, as previously mentioned, a method is suggested for removing such edges, and thereby the adherent artifacts. This suggested method may be implemented as follows. An edge detector may be applied on the low resolution depth or disparity map $D_{low}$, and the resulting edge map, $E_D$, may be used for removing, or filtering out, edges in areas with uniform depth, comprised in the edge map $E_I$. The edge map $E_D$ of the low resolution depth or disparity map $D_{low}$, may be further processed before being used on the edge map $E_I$, e.g., by use of a Gaussian filter, e.g. to widen the edges. However, other edge detection methods and/or filtering methods can also, or alternatively, be applied for deriving an edge map $E_D$ from the low resolution depth or disparity map $D_{low}$.

The resulting edge map $E_D$ is then used to mask out, i.e. remove, "unnecessary" edges in the edge map $E_I$, i.e. edges not representing depth changes, and thus not having a correspondence in the disparity or depth map. The edge map $E_I$, masked with the edge map $E_D$, is then used for creating the weighting map $Q_E$, mentioned above. A possible way to represent $Q_E$ is:

$$Q_E(x,y)=1(E_I(x,y) \cdot E_D(x,y)) \quad (5)$$

but it should be clear to anyone skilled in the art that other relations of $Q_E(x,y)$ with respect to $E_I(x,y)$ and $E_D(x,y)$ are possible.

Equations (1) and (2) define an over-determined system of linear equations, where certain depth values d(x, y) are known from the low resolution depth map and others are unknown, but defined by the linear equations. These equations may be solved by finding the least square error solution e.g. using a block-active method described in [3].

Figure 5:
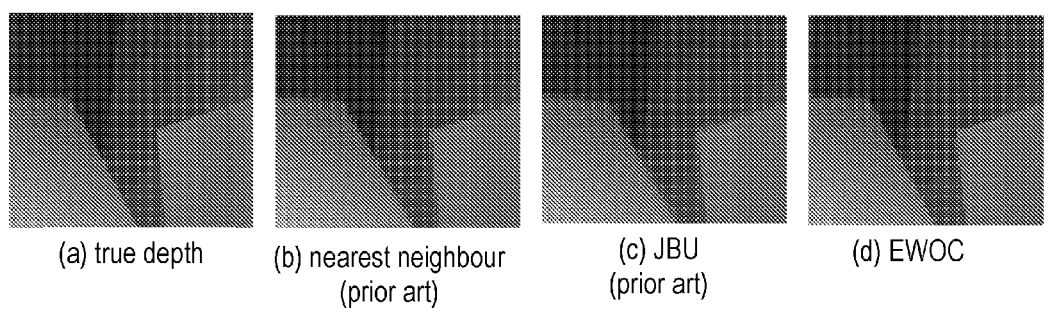
FIG. 5 shows results for depth map upscaling a factor 8 for the Middlebury "Venus" set. (a) shows the original depth, (b) a raw nearest neighbor upscaling. (c) is upscaled using JBU and (d) upscaled with the herein suggested technology (EWOC).
Figure 6:
FIG. 6(a) shows view synthesis results with 8× upscaled depth and (b) the difference to the original view, using state-of-the-art JBU.
Figure 6:
Figure 7:
FIG. 7(a) shows view synthesis results with 8× upscaled depth and (b) the difference to the original view, using the herein suggested technology (EWOC) for upscaling of the depth map.
Figure 7:
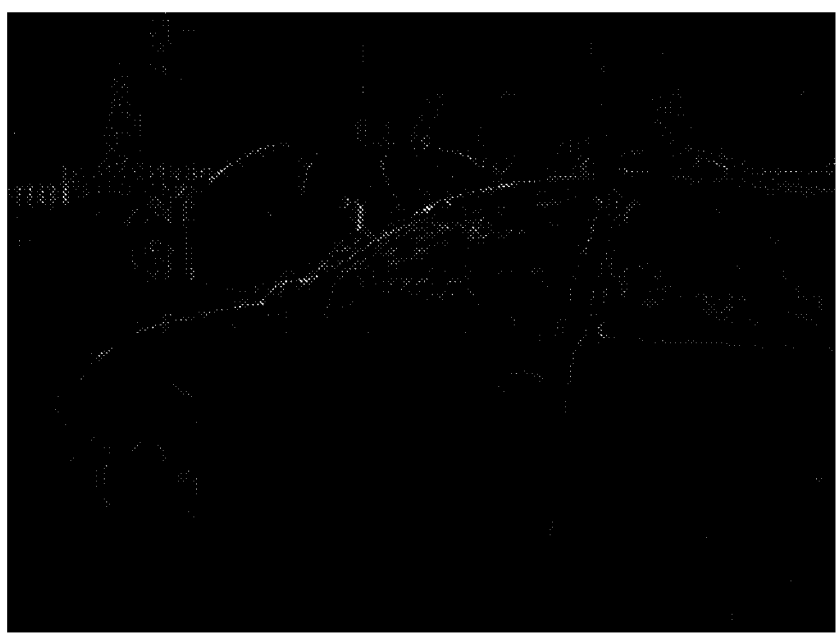

The approach suggested above results in smoother and better quality depth maps, as can be seen e.g. in FIG. 5. Even more importantly, the quality of views synthesized with these depth maps is consequently higher as shown in FIGS. 6-7. This holds both objectively and subjectively.

Figure 8:
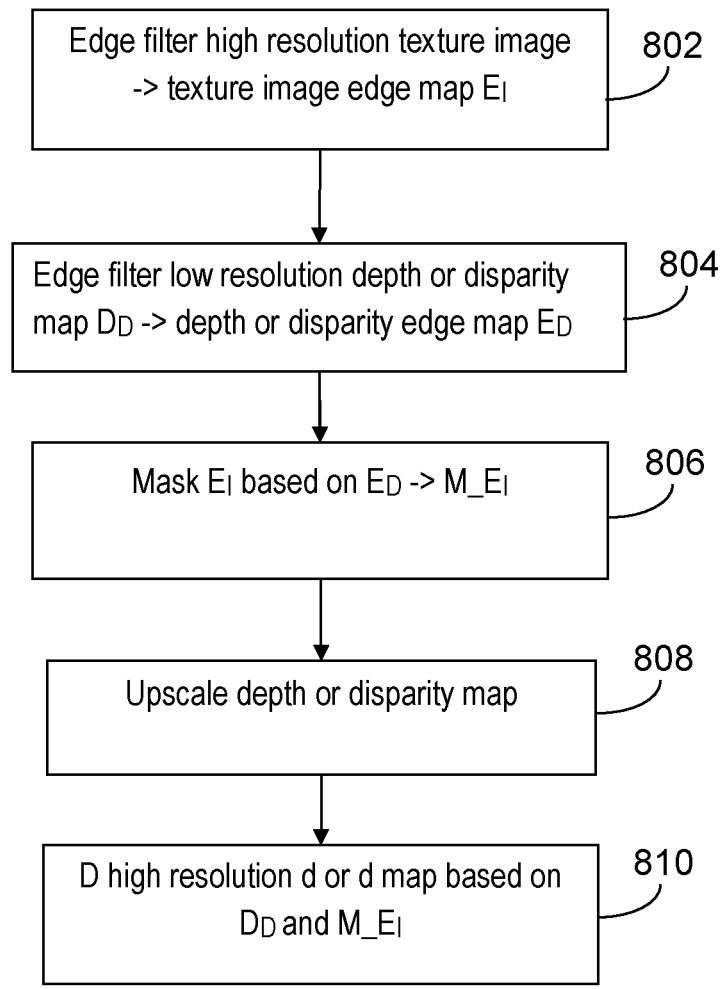
FIG. 8 is a flow chart illustrating a procedure according to and exemplifying embodiment of the herein suggested technology.

Exemplifying Procedure, FIG. 8

Figure 1A:
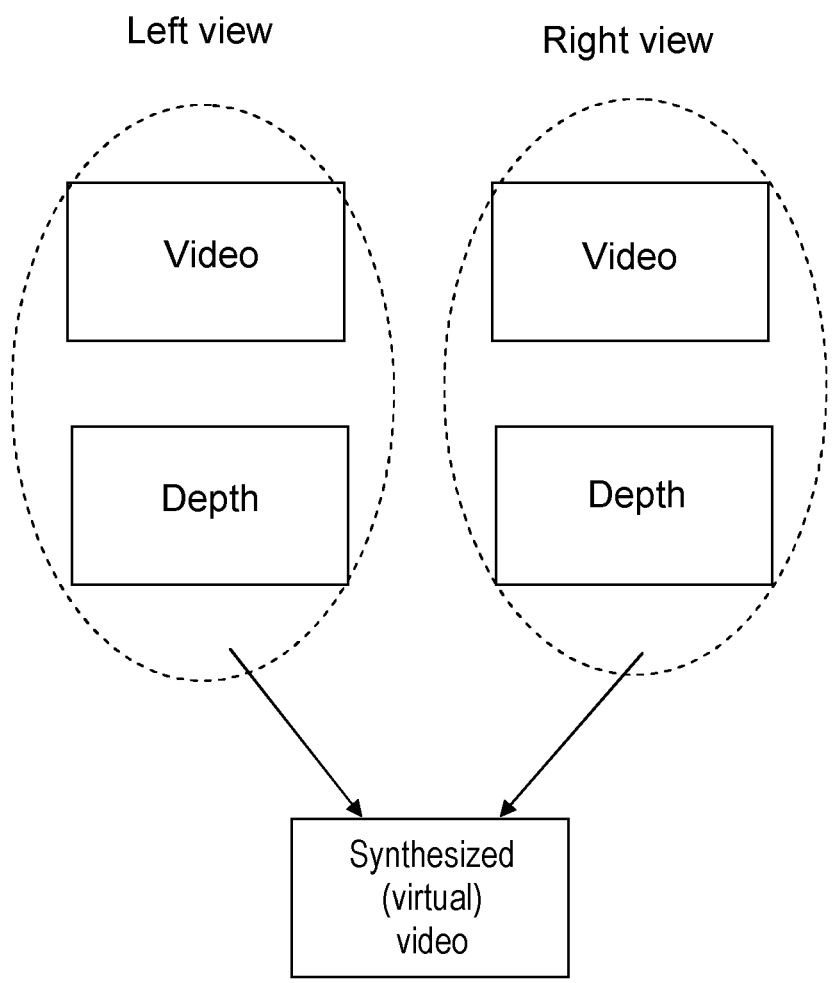
FIG. 1a illustrates synthesizing of virtual views from neighboring views
Figure 1B:
FIG. 1b illustrates common artifacts in synthesized views, which come from depth map upscaling with linear interpolation, according to the prior art.
Figure 2:
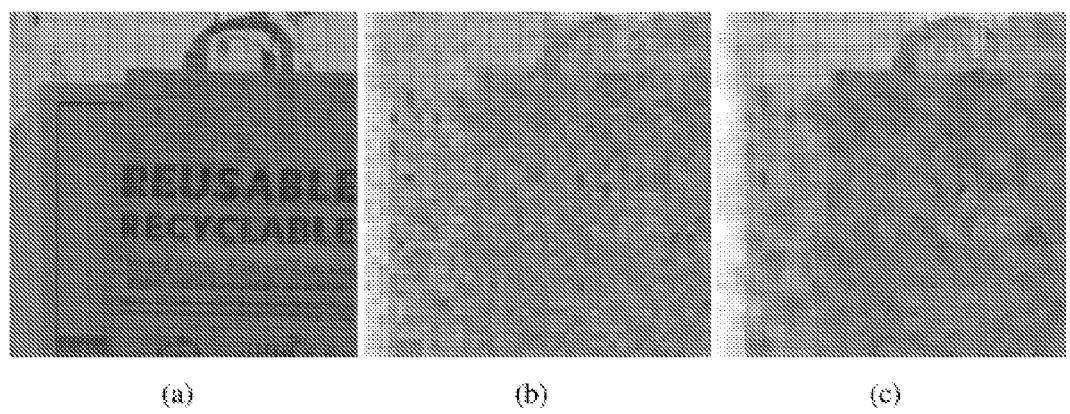
FIG. 2 shows a high resolution color image (a) and low resolution depth map (b) upsampled using conventional JBU (c). Note the copying of the intensity texture into geometry [1].
Figure 3:
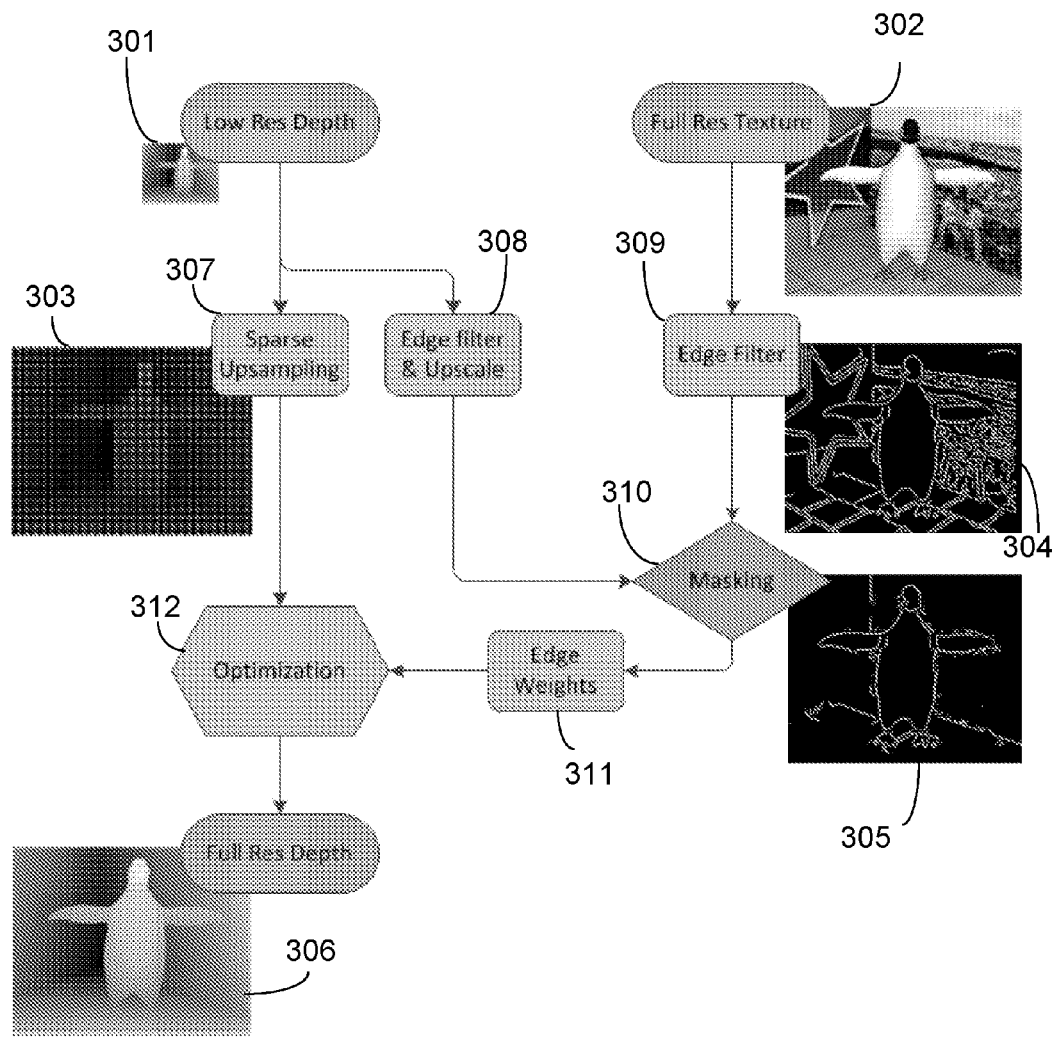
FIG. 3 is a schematic view illustrating an exemplifying procedure according to the suggested technology.

An exemplifying embodiment of the herein suggested procedure for increasing the resolution of a depth or disparity map in the context of multi view video will be described below with reference to FIG. 8. The procedure is assumed to be performed e.g. in a network node in a communication system, where it is desired to reconstruct multi-view video. For a more elaborate, although schematic, illustration of an exemplifying embodiment, please also view FIG. 3.

The procedure may be described as comprising the deriving of a high resolution depth map in an action 810, where the deriving is based on a low resolution depth map $D_D$ and a masked texture image edge map $M\_E_I$. The masked texture image edge map comprises information on edges in a high resolution texture image, which edges have a correspondence in the low resolution depth or disparity map $D_D$, and thus corresponds to edges representing a depth change. The high resolution texture image and the low resolution depth or disparity map should relate to the same view point and the same time instant which is here described as that they are associated with the same frame. Even though the difference between "high resolution" and "low resolution" in the context of video or images may be considered to be obvious, it is added for clarity that the low resolution depth map has a lower resolution than the texture image. This could also be described as that it comprises fewer known information points than the high resolution texture image.

With reference to FIG. 8, the procedure could alternatively be described as performing edge filtering on a high resolution texture image, I, in an action 802, resulting in a texture image edge map $E_I$. Further, performing edge filtering on a low resolution depth or disparity map $D_D$ in an action 804, resulting in a low resolution depth or disparity edge map $E_D$. Again, the low resolution depth or disparity map $D_D$ is of a lower resolution than the high resolution texture image, and the texture image and the depth map are associated with the same frame. The procedure may further be described as comprising masking of the texture image edge map $E_I$, based on information from the low resolution depth or disparity edge map $E_D$, resulting in a masked, high resolution, texture image edge map $M\_E_I$. Before creating the high resolution depth or disparity map in the action 810, as described above, the low resolution depth or disparity map is upscaled, e.g. as illustrated in FIG. 4, creating a sparse depth or disparity map. Sometimes, such a sparse image or map is referred to as a "sparse high resolution image" or "high resolution image comprising sparse pixel values". However, herein, it is not a sparse depth map that is referred to when it is stated that the resolution of a depth or disparity map should be increased. Herein the words "high resolution" is only used for images and depth or disparity maps, which are not sparse, unless explicitly stated otherwise.

The creating of a high resolution depth or disparity map in action 810 may be described as filling the empty positions in the upscaled sparse depth or disparity map (cf. FIG. 4) by an optimization in a linear least square manner. The optimization minimizes the error energy for a spatial smoothness constraint introduced in [4], weighted by edge information from the texture.

Figure 9:
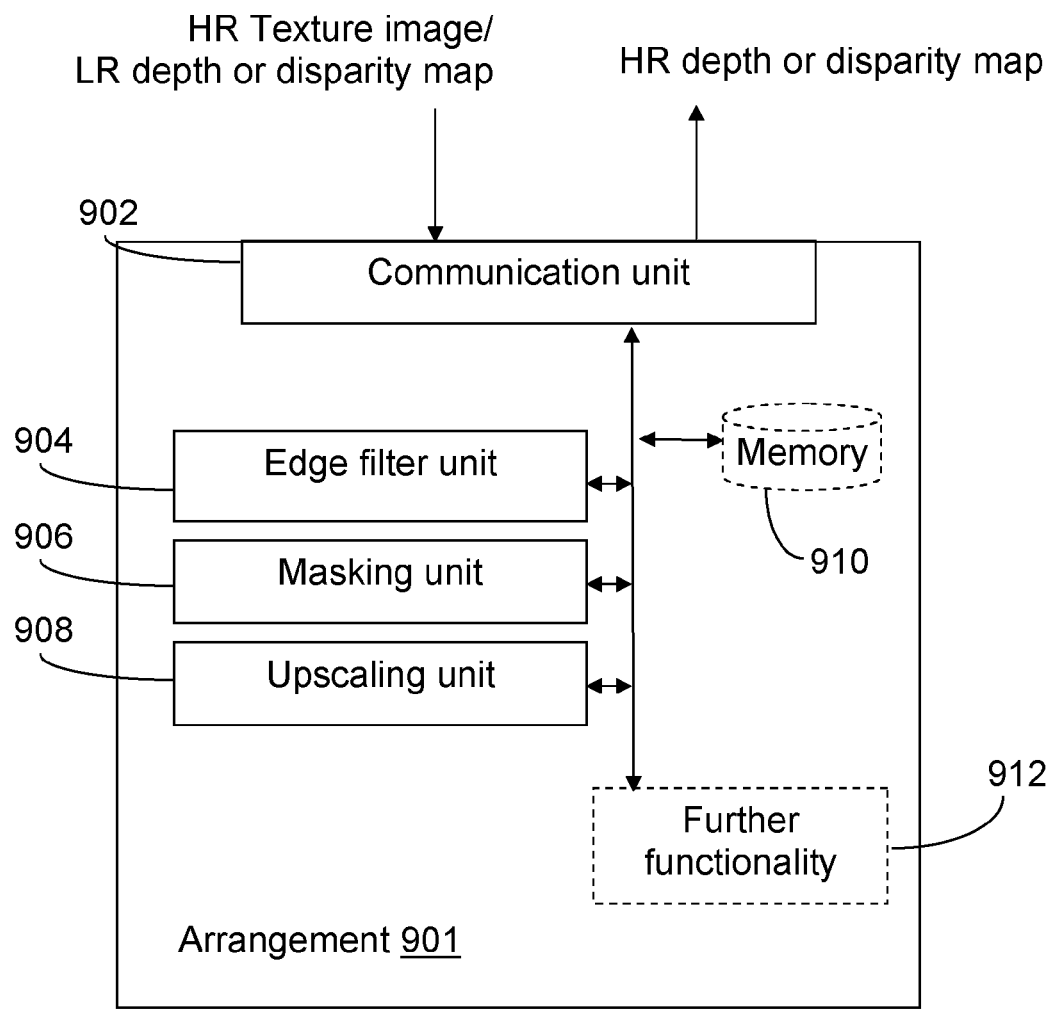
FIGS. 9-12 are block charts illustrating arrangements according to exemplifying embodiments.
Figure 10:
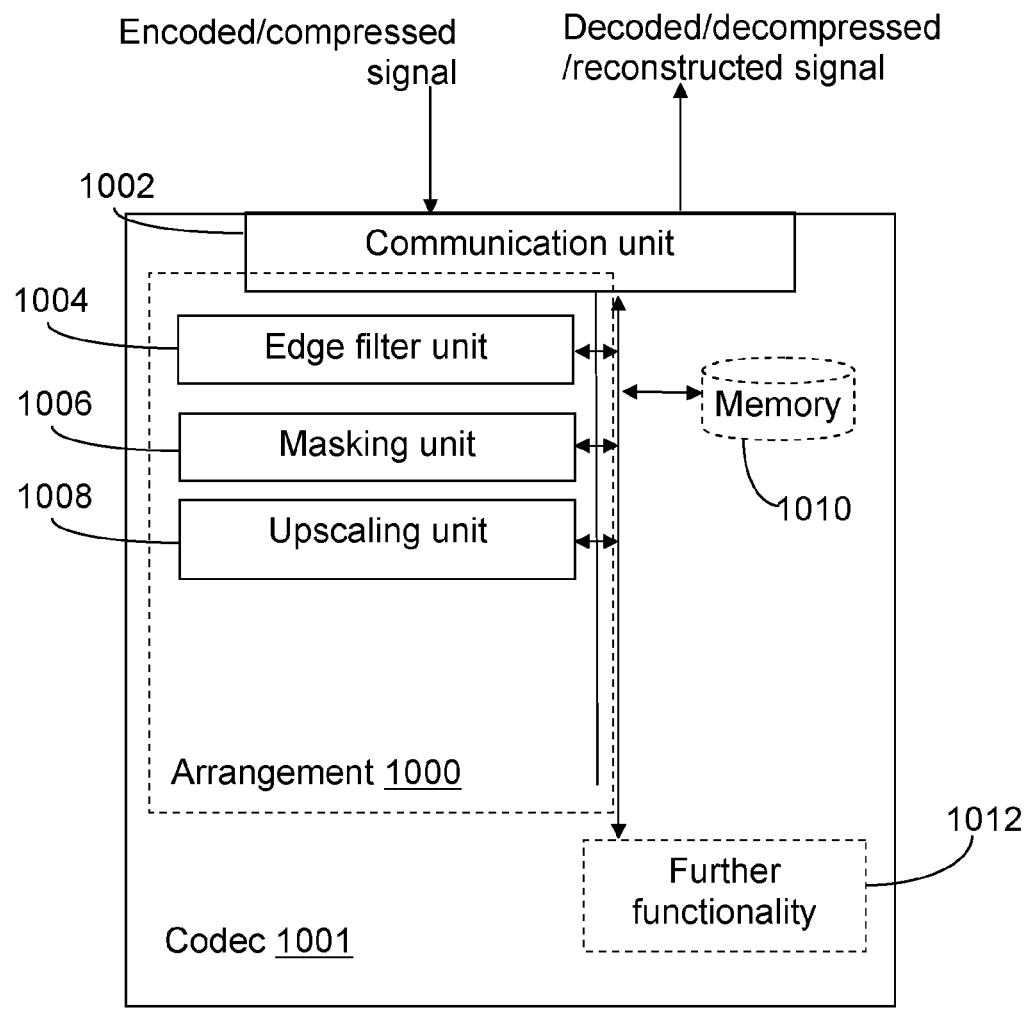

Exemplifying Arrangement, FIG. 9-10

Figure 11:
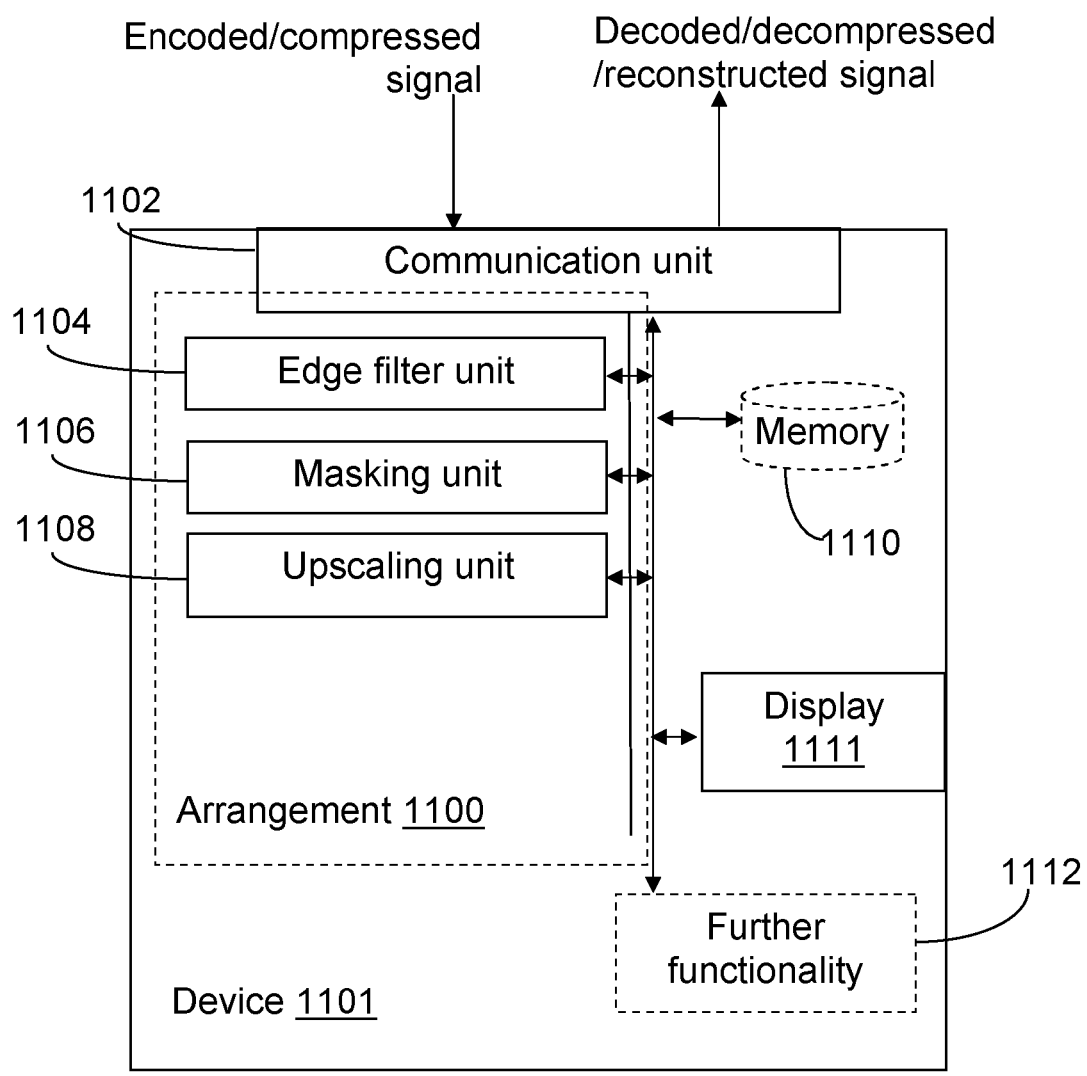

Below, an example arrangement 901, adapted to enable the performance of the above described procedure(s) for increasing the resolution of a depth or disparity map related to multi view video will be described with reference to FIG. 9. The arrangement is suitable for use in a network node, terminal or other device in which it is e.g. of interest to reconstruct a 3D scene in multi view video. In FIG. 10, the arrangement is illustrated as part of a codec, which in its turn may be comprised in a network node, such as e.g. a smartphone, tablet or personal computer or a dedicated video handling device, which, in turn, is illustrated in FIG. 11. The arrangement 901 is illustrated as to communicate with other entities via a communication unit 902. The arrangement may further comprise functional units 910 and 912 for providing e.g. data storage or other functions related to video.

The arrangement 901 could be implemented e.g. by one or more of: a processor or a micro processor and adequate software and memory for storing thereof, a Programmable Logic Device (PLD) or other electronic component(s) or processing circuitry configured to perform the actions described above.

The arrangement may be described as comprising an edge filter unit 904, adapted to perform edge detection on a high resolution texture image, I, thus providing a high resolution texture image edge map $E_I$, and further adapted to perform edge detection on a low resolution depth or disparity map $D_D$, thus providing a low resolution depth or disparity edge map $E_D$. The texture image and the depth or disparity map should be associated with the same frame, The arrangement may further be described as comprising a masking unit 906, adapted to mask the high resolution texture image edge map $E_I$ by use of the low resolution depth or disparity edge map $E_D$, thus providing a masked, high resolution, texture image edge map $M\_E_I$. The masking should be performed such that only edges, in the high resolution texture image edge map $E_I$, which have a correspondence in the depth or disparity edge map $E_D$ remain in the masked texture image edge map $M\_E_I$. Edges in $E_I$, which do not have a correspondence in the depth or disparity map-edge map $E_D$ should be masked out.

The arrangement 901 could further be described as comprising an upscaling unit 908, adapted to derive a high resolution depth map, $D_{DHR}$, based on the low resolution, or sparse, depth map $D_D$ and the masked texture image edge map $M\_E_I$. In case it is not performed before, the upscaling unit could also be adapted to upscale the low resolution depth map $D_D$ to a sparse depth map, in the sense of FIG. 4, before or as part of the deriving of the high resolution depth map, $D_{DHR}$.

In case the low resolution depth map $D_D$ and the masked texture image edge map $M\_E_I$ are retrieved e.g. from another unit or entity than a unit or entity within the arrangement 901, only the upscaling unit 908, and not the edge filter unit 904 or the masking unit 906, needs to be comprised in the arrangement 901. Again, it is clarified that the low resolution depth map has a lower resolution than the texture image, the meaning of which should be obvious to a person skilled in the art.

FIG. 10 illustrates an arrangement 1000, as the one illustrated in FIG. 9, incorporated in a video codec 1001. The communication unit of the arrangement is here illustrated as being integrated with a communication unit 1002 of the codec. A similar illustration is shown in FIG. 11, where the arrangement is incorporated in a device 1101, such as a TV-set, a computer, a mobile terminal, or any other device that has a multiview video decoding and view synthesis capability. 3D video reconstructed using upscaled depth or disparity maps could e.g. be displayed on a display 1111 of the device, or be provided to an external unit or display.

Figure 12:
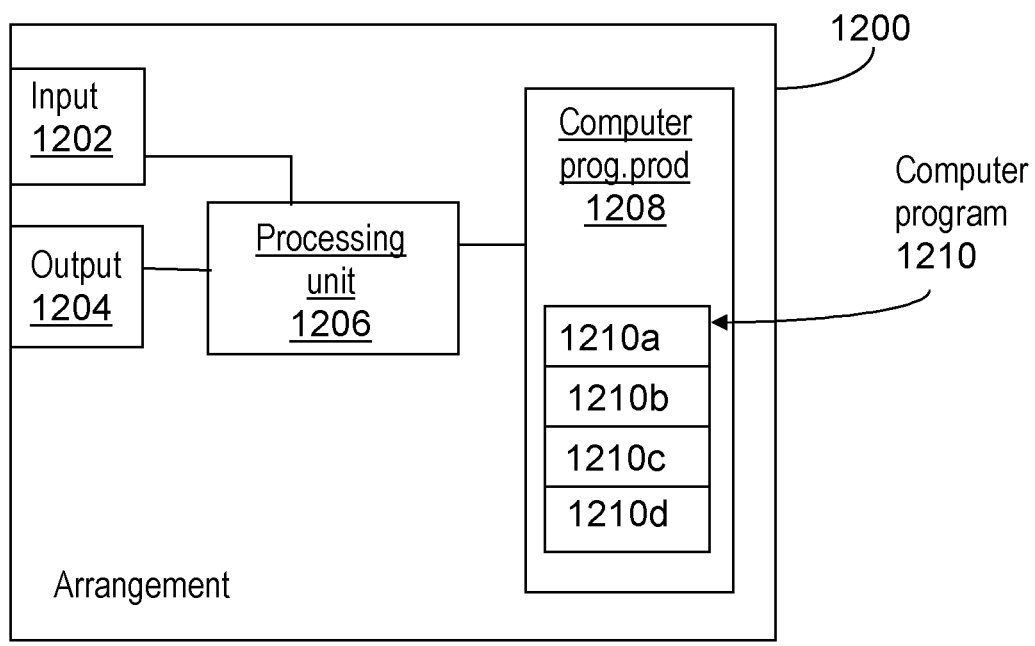

Exemplifying Arrangement, FIG. 12

FIG. 12 schematically shows a possible embodiment of an arrangement 1200, which also can be an alternative way of disclosing an embodiment of the arrangement(s) illustrated in FIGS. 9-11. Comprised in the arrangement 1200 are here a processing unit 1206, e.g. with a DSP (Digital Signal Processor). The processing unit 1206 may be a single unit or a plurality of units to perform different actions of procedures described herein. The arrangement 1200 may also comprise an input unit 1202 for receiving signals from other entities, and an output unit 1204 for providing signal(s) to other entities. The input unit 1202 and the output unit 1204 may be arranged as an integrated entity.

Furthermore, the arrangement 1200 comprises at least one computer program product 1208 in the form of a non-volatile memory, e.g. an EEPROM (Electrically Erasable Programmable Read-Only Memory), a flash memory and a hard drive. The computer program product 1208 comprises a computer program 1210, which comprises code means, which when executed in the processing unit 1206 in the arrangement 1200 causes the arrangement and/or a node in which the arrangement is comprised to perform the actions e.g. of the procedure described earlier in conjunction with FIG. 8.

The computer program 1210 may be configured as a computer program code structured in computer program modules. Hence, in an exemplifying embodiment, the code means in the computer program 1210 of the arrangement 1200 may comprise an edge filter module 1210*a* for deriving edge maps from texture images and/or depth or disparity maps. The arrangement 1200 may further comprise a masking module 1210*b* for masking a texture image edge map using a depth or disparity map-edge map. The computer program should comprise an upscaling module 1210*c* for computing a high resolution depth map based on a low resolution depth map and a masked texture image edge map. The computer program 1210 may further comprise a module 1210*d* e.g. for further processing of the depth map.

The modules 1210*a-d* could essentially perform the actions of the flows illustrated in FIG. 8, to emulate the arrangement illustrated in FIG. 9.

Although the code means in the embodiment disclosed above in conjunction with FIG. 12 are implemented as computer program modules which when executed in the processing unit causes the decoder to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the network node.

While the method and arrangement for increasing the resolution of a depth or disparity map related to multi view video, as suggested above, has been described with reference to specific embodiments provided as examples, the description is generally only intended to illustrate the inventive concept and should not be taken as limiting the scope of the suggested methods and arrangements, which are defined by the appended claims. While described in general terms, the method and arrangement may be applicable e.g. in different types of communication systems and/or devices concerned with video and upscaling of depth or disparity maps.

It is also to be understood that the choice of interacting units or modules, as well as the naming of the units are only for exemplifying purpose, and nodes suitable to execute any of the methods described above may be configured in a plurality of alternative ways in order to be able to execute the suggested process actions.

It should also be noted that the units or modules described in this disclosure are to be regarded as logical entities and not with necessity as separate physical entities.

ABBREVIATIONS

3DTV: Three-dimensional television
EWOC: Edge Weighted Optimization Concept
FTV: Free-viewpoint television
JBU: Joint Bilateral Upscaling
MVC: Multiview video coding
MVD: Multiview+Depth
MRF: Markov random field
NAFDU: Noise-aware filter for depth Upsampling
ToF: Time-of-Flight

REFERENCES

[1] D. Chan, H. Buisman, C. Theobalt, and S. Thrun, "A noise aware filter for real-time depth upsampling," in Workshop on Multi-camera and Multi-modal Sensor Fusion Algorithms and Applications, 2008.
[2] F. Garcia, B. Mirbach, B. Ottersten, F. Grandidier, and A. Cuesta, "Pixel weighted average strategy for depth sensor data fusion," in IEEE 17th International Conference on Image Processing, 2010.
[3] Portugal, L. F., Judice, J. J., and Vicente, L. N., "A comparison of block pivoting and interior-point algorithms for linear least squares problems with nonnegative variables," Mathematics of Computation 63, 625-643 (October 1994).
[4] Moshe Guttmann, Lior Wolf and Daniel Cohen-or, "Semiautomatic stereo extraction from video footage," Proc. International Conference on Computer Vision (ICCV), 2009.

The invention claimed is:

1. A method for producing a high resolution depth or disparity map, the method comprising:
    obtaining a depth or disparity map associated with a frame;
    obtaining a texture image associated with said frame, wherein the depth or disparity map has a lower resolution than the texture image;
    generating, from the depth or disparity map, a first edge map identifying edges in the depth or disparity map;
    generating, from the obtained texture image, a second edge map identifying edges in the texture image, said edges in the texture image consisting of a first set of edges a second set of edges, wherein each edge included in the first set of edges corresponds to an edge identified by the first edge map and each edge included in the second set of edges does not correspond to any edge identified by the first edge map;
    masking the second edge map, generated from the obtained texture image, using the first edge map, generated from the depth or disparity map, to produce a masked texture image edge map that comprises the edges included in the first set of edges but does not comprise the edges included in the second set of edges; and
    deriving the high resolution depth or disparity map based on the depth or disparity map and the masked texture image edge map, wherein
    masking the second edge map using the first edge map to produce the masked texture image map comprises removing from the second edge map all edges identified by the second edge map that do not correspond to at least one the edges identified in the first edge map, thereby producing the masked texture image edge map.

2. The method of claim 1, wherein deriving the high resolution depth or disparity map based on the depth or disparity map and the masked texture image edge map comprises:
  using the depth or disparity map to generate a sparse depth map;
  deriving edge weights from said masked texture image edge map; and
  deriving the high resolution depth or disparity map using the sparse depth map and said edge weights.

3. The method of claim 1, wherein the deriving of the high resolution depth or disparity map involves a weighting function, Q, allowing pixels associated with edges to be less similar to their neighboring pixels as compared to pixels not associated with edges.

4. The method of claim 1, wherein
  generating the second edge map from the texture image comprises performing edge filtering on the texture image, and
  generating the first edge map from the depth or disparity map comprises performing edge filtering on the depth or disparity map.

5. An apparatus for producing a high resolution depth or disparity map, the apparatus comprising:
  a memory; and
  a processing unit comprising one or more processors coupled to the memory, wherein the processing unit is configured to:
  obtain a depth or disparity map associated with a frame;
  obtain a texture image associated with said frame, wherein the depth or disparity map has a lower resolution than the texture image;
  generate, from the depth or disparity map, a first edge map identifying edges in the depth or disparity map;
  generate, from the obtained texture image, a second edge map identifying edges in the texture image, said edges in the texture image consisting of a first set of edges a second set of edges, wherein each edge included in the first set of edges corresponds to an edge identified by the first edge map and each edge included in the second set of edges does not correspond to any edge identified by the first edge map;
  mask the second edge map generated from the obtained texture image using the first edge map generated from the depth or disparity map to produce a masked texture image edge map that comprises the edges included in the first set of edges but does not comprise the edges included in the second set of edges; and
  derive the high resolution depth or disparity map based on the depth or disparity map and the masked texture image edge map, wherein
  the processing unit is configured to mask the second edge map using the first edge map to produce the masked texture image map by removing from the second edge map all edges identified by the second edge map that do not correspond to at least one the edges identified in the first edge map, thereby producing the masked texture image edge map.

6. A video codec comprising the apparatus of claim 5.

7. A mobile terminal comprising the apparatus of claim 5.

8. A computer program product comprising a non-transitory computer readable medium storing a computer program comprising computer readable code that when executed by an apparatus, causes the apparatus to perform the method of claim 1.

9. The apparatus of claim 5, wherein the processing unit is configured to derive the high resolution depth or disparity map by:
  using the depth or disparity map to generate a sparse depth map;
  deriving edge weights from said masked texture image edge map; and
  using the sparse depth map and said edge weights to derive the high resolution depth or disparity map.

10. The apparatus of claim 5, wherein the deriving of the high resolution depth or disparity map involves a weighting function, Q, allowing pixels associated with edges to be less similar to their neighboring pixels as compared to pixels not associated with edges.

11. The apparatus of claim 5, wherein
  the processing unit is configured to generate first edge map by edge filtering the texture image, and
  the processing unit is configured to generate the second edge map from the depth or disparity map by edge filtering the depth or disparity map.

* * * * *